Patented June 19, 1923.

1,459,581

UNITED STATES PATENT OFFICE.

CHARLES DEAN DRAPER, OF PORTLAND, OREGON.

FLEXIBLE VARNISH.

No Drawing.  Application filed September 12, 1921. Serial No. 500,207.

*To all whom it may concern:*

Be it known that I, CHARLES DEAN DRAPER, a citizen of the United States, and a resident of Portland, State of Oregon, have invented a new and useful Improvement in Flexible Varnishes, of which the following is a specification.

The invention relates to dressings for fabrics and the like, and particularly to water and weather-proof varnishes for finishing and giving a glossy, water and weather-proof surface to fabrics of all kinds, including pantasote, fabricoid, leather, etc. The dressing is particularly applicable for finishing motor vehicle tops and curtains, tents, awnings, and other fabrics which must be folded in use.

The object of the invention is to provide a surface dressing or varnish for the purpose stated which is not only stable, water and weather proof and glossy, but which is also flexible so that it will not crack or chip when the fabric to which it is applied is folded or creased.

The dressing has as its base any commercial varnish composition, that is, a composition having as its essentials a resinous matter or gum, such as rosin, copal, or the like, dissolved in a suitable vehicle, such as boiled linseed oil. Preferably the varnish composition employed will be of the water or weather-proof variety, of which a number are well known and on the market, one commercial product of this kind being that known as "Valspar varnish." To such varnish composition, after the same has passed the stage where boiling is required, there is added and intimately mixed therewith, raw linseed oil. The quantity of linseed oil to be mixed with the varnish composition may be varied and the precise quantities which will be used have to do largely with the cost of manufacture and can be varied to suit conditions. Excellent results have been secured by using commercial "Valspar varnish" and raw linseed oil in substantially equal parts, but reasonable variations from these proportions produce no noticeable effect in the final result.

Suitable coloring matter may be added to give the desired color to the finish. Quick drying coach colors ground in japan, or other pigment coloring matter, are preferred because they are not dyes and hence do not fade or tend to rot the fabrics, as do the dyes used in many commercial automobile top dressings.

In making up the dressing the varnish composition may be prepared in any of the well known ways of preparing varnish, or commercial water-proof varnish may be used. The raw linseed oil must not be added until the preparation of the varnish composition is complete, or at least has passed the stage where further boiling is necessary. After the varnish composition has reached such stage, and supposing that coloring matter is desired to be added, the coloring matter should be first thoroughly mixed with a small proportion of the varnish composition in order to insure a thorough and smooth mixture with the other ingredients. The remainder of the varnish composition and the raw linseed oil are then added and the whole mixed together by stirring, and without boiling or heating. Finally, a small portion of suitable drier, such as japan drier, is added, satisfactory results being secured by adding about one part of japan drier to 128 parts of the varnish composition and raw linseed oil combined.

The composition above named forms an intimate mixture which can be made up and stored without separation of the ingredients. It can be applied to the surface to be coated in the usual way of applying varnishes or the well known dressings for automobile tops. It is essential that the raw linseed oil be added when the mixture is cold, or at least without such temperature as would materially heat the linseed oil, it being essential that the linseed oil in the final composition be in its raw state.

Automobile tops and curtains of well known fabrics when treated with the above named dressing have a finish which is glossy, perfectly smooth, stable, and absolutely flexible, no cracking or chipping of the finish being noticeable after repeated sharp flexings of the fabric. So flexible is the varnish coating that subjecting the folded fabric to heavy pressure fails to produce observable cracks or creases in the surface finish. I attribute this flexible characteristic to the fact that the varnish contains a considerable proportion of linseed oil in the raw state.

I believe I am the first to have produced a surface dressing which gives a finish having all the appearance of the highest grade varnish finishes and which is absolutely flexible. The ordinary commercial varnishes will not withstand flexings or folding of a fabric to which they are applied without chipping or cracking, notwithstanding that some are claimed to be flexible.

I claim:

1. As a new composition of matter, a flexible varnish-like surface dressing consisting of a boiled-oil gum varnish composition and raw linseed oil, the said varnish composition and linseed oil being mixed in a cold state, whereby said linseed oil remains in its raw state in the final composition.

2. As a new composition of matter, a flexible varnish-like surface dressing consisting of a varnish composition and raw linseed oil in approximately equal proportions.

3. As a new composition of matter, a flexible varnish-like surface dressing consisting of a water proof varnish composition and raw linseed oil in approximately equal proportions.

4. As a new composition of matter, a flexible varnish-like surface dressing consisting of a boiled-oil gum varnish composition, a relatively large percentage of raw linseed oil, and a small percentage of a drier, said composition being mixed in the cold state, whereby said linseed oil remains in its raw state in the final composition.

In testimony whereof, I sign my name.

CHARLES DEAN DRAPER.

Witnesses:
EDITH FRANCIS,
R. C. TAYLOR.